(12) United States Patent
Yamada (10) Patent No.: US 7,872,461 B2
(45) Date of Patent: Jan. 18, 2011

(54) REVERSE CURRENT STOPPING CIRCUIT OF SYNCHRONOUS RECTIFICATION TYPE DC-DC CONVERTER

(75) Inventor: Kouhei Yamada, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 100 days.

(21) Appl. No.: 12/453,751

(22) Filed: May 21, 2009

(65) Prior Publication Data

US 2009/0295350 A1 Dec. 3, 2009

(30) Foreign Application Priority Data

May 29, 2008 (JP) .............................. 2008-140594

(51) Int. Cl.
*G05F 1/00* (2006.01)
(52) U.S. Cl. ..................................... 323/284
(58) Field of Classification Search .......... 323/282–285
See application file for complete search history.

(56) References Cited

U.S. PATENT DOCUMENTS 7,019,507 B1* 3/2006 Dittmer et al. .............. 323/284
7,250,745 B2* 7/2007 Yasukouchi et al. ......... 323/284
2007/0018628 A1* 1/2007 Akashi et al. ............... 323/284
2008/0203990 A1* 8/2008 Nishida ....................... 323/284
2009/0243577 A1* 10/2009 Lim ............................ 323/283

FOREIGN PATENT DOCUMENTS

JP 2006-60977 A 3/2006
JP 2007-236194 A 9/2007

* cited by examiner

*Primary Examiner*—Bao Q Vu
*Assistant Examiner*—Jue Zhang
(74) *Attorney, Agent, or Firm*—Kanesaka Berner & Partners

(57) ABSTRACT

A reverse current stopping circuit includes a synchronous rectification device, a comparator for detecting a reverse current of an inductor, the synchronous rectification device being turned off when the reverse current is detected by the comparator, a reverse current detector circuit for detecting a switching terminal voltage after the synchronous rectification device is turned off, thereby determining a value of the inductor current to decide whether the inductor current is flowing in a reverse direction or a forward direction, and a memory unit for receiving a predetermined output signal from the reverse current detector circuit in accordance with a result of the reverse current detector circuit, and outputting a control signal for an offset voltage in accordance with the predetermined output signal. The offset voltage is changed in accordance with the control signal so as to adjust the inductor current to zero when the synchronous rectification device is turned off.

7 Claims, 7 Drawing Sheets

WHEN Mn IS TURNED OFF LATE
(CORRESPONDING TO FIG. 2C)

Fig. 5

WHEN Mn HAS BEEN TURNED OFF EARLY (CORRESPONDING TO FIG. 2B)

REVERSE CURRENT STOPPING CIRCUIT OF SYNCHRONOUS RECTIFICATION TYPE DC-DC CONVERTER

BACKGROUND OF THE INVENTION

The present invention relates to a reverse current stopping circuit of a synchronous rectification type DC-DC converter, which detects a reverse current of an inductor current of an inductor located in an output portion of the synchronous rectification type DC-DC converter and stops the reverse current.

Figure 7:
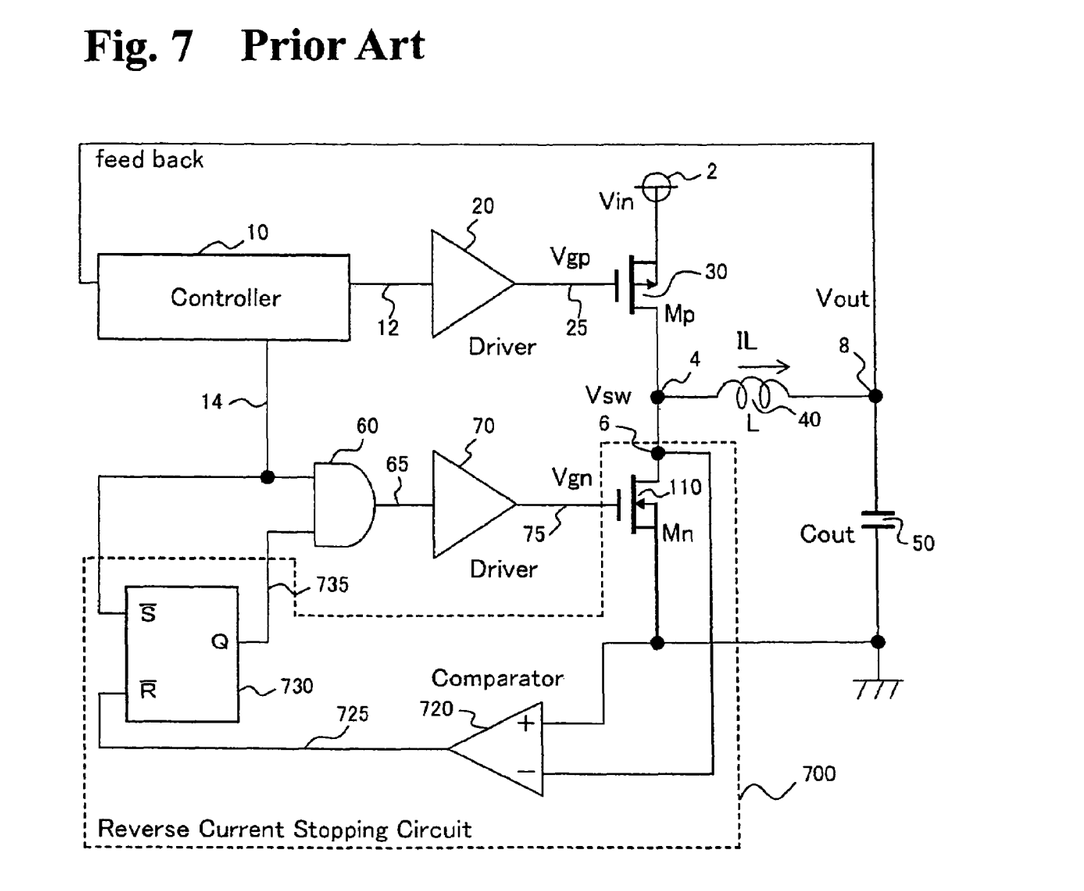
FIG. 7 is a diagram showing the configuration of a conventional-type reverse current stopping circuit of a synchronous rectification type DC-DC converter.

FIG. 7 is a diagram showing the configuration of a reverse current stopping circuit of a synchronous rectification type DC-DC converter according to a conventional art. The synchronous rectification type DC-DC converter uses a synchronous rectification MOSFET (Metal Oxide Semiconductor Field Effect Transistor) Mn in place of a freewheeling diode (not shown) so as to reduce conduction loss, thereby improving efficiency under heavy load conditions. However, the MOSFET used as a synchronous rectification device allows a current to flow therein in a reverse direction. Therefore, when a current is conducted to a switching device Mp (30) and the synchronous rectification MOSFET Mn (hereinafter referred to as "Mn" simply) (110) complementary thereto, an inductor current IL of an inductor L (40) flows back under light load conditions so that the efficiency deteriorates. The inductor L (40) together with an output capacitor Cout (50) forms an output portion of the synchronous rectification type DC-DC converter to supply electric power to a load (not shown). A circuit (reverse current stopping circuit) is used to prevent the inductor current IL from flowing back. The reverse current stopping circuit uses a comparator (720) to detect that a drain to source voltage Vds of the Mn (110) has exceeded 0 V, and turns off the Mn (110).

For example, such reverse current stopping circuits are also disclosed in Japanese Unexamined Patent Application Publications No. JP-A-2006-14482 (paragraphs [0067]-[0072] and FIG. 4: Patent Document 1), JP-A-2006-60977 (Patent Document 2), and JP-A-2007-236194 (Patent Document 3).

In the background-art reverse current stopping circuit of the synchronous rectification type DC-DC converter shown in FIG. 7, the switching device Mp (30) including a P-channel MOSFET and the Mn (110) including an N-channel MOSFET operating complementarily to the switching device Mp (30) are connected in series between an input voltage terminal Vin (2) and the ground, while a series circuit of the inductor L (40) and the output capacitor Cout (50) is connected in parallel to the Mn (110). An end-to-end voltage of the output capacitor Cout (50) obtained from a node between the inductor L (40) and the output capacitor Cout (50), that is, an output voltage Vout (8) is fed back and applied to a controller (10). The controller (10) controls the operation of switching devices provided in the DC-DC converter to obtain a constant output voltage at an output terminal thereof. The controller (10) outputs a first control signal (12) and a second control signal (14) based on the fed-back output voltage Vout (8). The first control signal (12) is supplied to a driver (20). The driver (20) applies a driver output Vgp (25) to a gate of the switching device Mp (30).

On the other hand, the second control signal (14) is supplied to one of input terminals of an AND circuit (60) and a set terminal of a flip-flop (730). The first control signal (12) and the second control signal (14) outputted from the controller (10) are outputted as pulse signals whose duty ratios vary in accordance with the output voltage Vout (8). The duty ratios are in the same phase except for a dead time period provided for preventing the Mp (30) and the Mn (110) from being turned on concurrently (the pulse signals serve to turn off both the Mp (30) and the Mn (110) in the dead time period). A Q output (735) of the flip-flop (730) is applied to the other input terminal of the AND circuit (60). The output of the AND circuit (60) is applied to a driver (70). The driver (70) applies a driver output Vgn (75) to a gate of the Mn (110). A reference voltage (ground potential) is applied to a non-inverting input terminal of a comparator (720).

On the other hand, a potential Vsw (switching terminal voltage) of a node (4) between a drain of the Mn (110) and the inductor L (40) is applied to an inverting input terminal of the comparator (720) through a node (6). An output terminal of the comparator (720) is connected to a reset terminal of the flip-flop (730). Thus, a reverse current stopping circuit (700) includes the comparator (720), the flip-flop (730) and the Mn (110). The set input and the reset input of the flip-flop (730) are negative logic inputs.

The operation of the conventional-type reverse current stopping circuit of the synchronous rectification type DC-DC converter configured as shown above will be explained. The comparator (720) compares the reference voltage (ground potential) with the potential Vsw of the node (4) between the drain of the Mn (110) and the inductor L (40) obtained through the node (6). Upon detection of the fact that the potential Vsw is higher than the reference voltage (that is, a current of the Mn (110) is flowing from the node (4) toward the ground), the comparator (720) outputs a logic L level as an output signal (725), and supplies the logic L level to the reset terminal of the flip-flop (730). Upon detection of the logic L level supplied to the reset terminal, the flip-flop (730) sets the Q output (735) at the logic L level. In response thereto, the AND circuit (60) sets its output (65) at the logic L level. As a result, the driver (70) sets the gate of the Mn (110) at the logic L level so that the Mn (110) cannot be switched on. Thus, the inductor current IL flowing into the inductor L (40) can be prevented from flowing back.

The flip-flop (730) reset in a cycle is set by a trailing edge of the second control signal (14) in a subsequent cycle. As a result, the Q output (735) of the flip-flop (730) has a logic H level to allow the second control signal (14) of the controller (10) to pass through the AND circuit (60) till the logic L level of the output signal (725) is supplied to the reset terminal of the flip-flop (730). The logic H level signal of the second control signal (14) is applied to the gate of the Mn (110) through the driver (70) to switch on the Mn (110). Thus, the reverse current stopping circuit 700 is allowed to operate again.

When the conventional-type comparator in the reverse current stopping circuit of the synchronous rectification type DC-DC converter shown in FIG. 7 is manufactured, some variation in input voltage offset occurs (about ±10 mV in case of CMOS (Complementary MOS)). Due to the variation, the accuracy in detection of a reverse current deteriorates. Particularly in a high-current DC-DC converter, even a very small detection error of a drain-to-source voltage Vds becomes a large current error due to a low ON resistance of the synchronous rectification MOSFET Mn. Thus, it is unlikely that a reverse current can be stopped. It is, therefore, necessary to deal with the variation in input voltage offset sufficiently.

According to Patent Document 1, an offset is provided for detection of an emission current so that the timing when a synchronous rectification MOSFET turned on to emit electric power to a load is turned off can be synchronized with the timing when the emission current is inverted to send back load-side excess electric power. Turning off the synchronous transistor is delayed by the addition of the offset so that the electric power supplied excessively to the load under light load conditions can be sent back. However, there is no suggestion about how to increase or decrease an offset voltage to avoid influence of the variation in input offset voltage of the comparator so as to adjust the threshold level of the comparator to a point where no reverse current exists.

According to Patent Document 2, a reverse current detector circuit having a comparator is provided in a switching power supply unit. In the switching power supply unit, temperature dependency is given to a reference voltage to be supplied to the comparator for detecting a reverse current or an input offset of the comparator, so that a synchronous rectification MOSFET can be turned off at an optimum timing even if the temperature changes. However, there is no suggestion about how to increase or decrease an offset voltage to avoid influence of the variation in input offset voltage of the comparator so as to adjust the threshold level of the comparator to a point where no reverse current exists.

According to Patent Document 3, a circuit independent of a control circuit system of a synchronous rectification MOSFET is used to block a reverse current flowing into the synchronous rectification MOSFET. Thus, it is possible to shorten a delay time between the time when the occurrence of the reverse current is detected and the time when the reverse current is blocked. However, there is no suggestion about how to increase or decrease an offset voltage to avoid influence of the variation in input offset voltage of a comparator so as to adjust the threshold level of the comparator to a point where no reverse current exists.

When a comparator is manufactured by using semiconductor technology, some degree of variation unavoidably occurs in input voltage offset. Thus, accuracy in detection of a reverse current by the comparator deteriorates. In any aforementioned conventional type technique, there is no suggestion about how to increase or decrease an offset voltage to avoid influence of the variation in input offset voltage of the comparator so as to adjust the threshold level of the comparator to a point where no reverse current exists.

Therefore, an object of the present invention is to provide a reverse current stopping circuit of a synchronous rectification type DC-DC converter free from influence of a variation in input offset voltage of a comparator.

Further objects and advantages of the invention will be apparent from the following description of the invention.

SUMMARY OF THE INVENTION

The present invention provides a reverse current stopping circuit of a synchronous rectification type DC-DC converter, comprising: a comparator for detection of a reverse current of an inductor current from a drain to source voltage of a synchronous rectification device; and the synchronous rectification device which is turned off as soon as the reverse current of the inductor current is detected by the comparator, wherein the reverse current stopping circuit further includes a reverse current detector circuit and a memory unit. The reverse current detector circuit detects a switching terminal voltage immediately after the synchronous rectification device is turned off. With the detected switching terminal voltage, the reverse current detector circuit determines a value of the inductor current at a point of time when the synchronous rectification device is turned off. With the determined value of the inductor current, the reverse current detector circuit decides whether the inductor current is flowing in a reverse direction from the inductor toward the synchronous rectification device or in a forward direction from the inductor to an output terminal. In accordance with the decision, the reverse current detector circuit outputs a predetermined output signal to the memory unit. In accordance with the output signal, the memory unit supplies a control signal for controlling an offset voltage to the comparator. In accordance with the control signal for controlling the offset voltage, the offset voltage of the comparator is changed to adjust the value of the inductor current to zero at a point of time when the synchronous rectification device is turned off.

According to the present invention, even if there is a wide variation in input offset voltage of the comparator, the offset voltage can be increased or decreased to adjust an effective threshold level of the comparator to a point where no reverse current exists. Thus, the inductor current can be prevented from flowing back.

DETAILED DESCRIPTION OF PREFERRED EMBODIMENTS

The preferred embodiments for carrying out the invention will be described below in detail with reference to the drawings.

Figure 1:
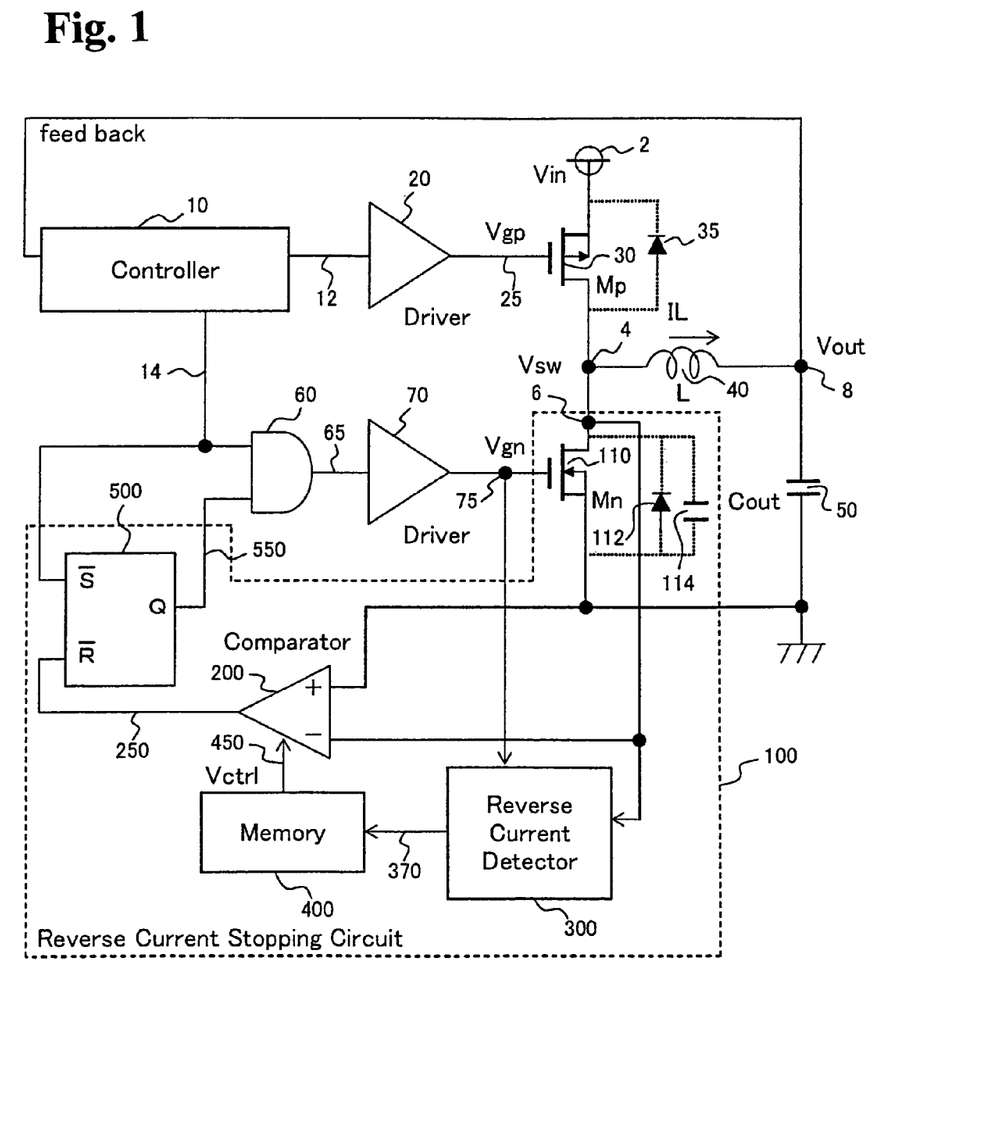
FIG. 1 is a diagram showing a configuration of a reverse current stopping circuit of a synchronous rectification type DC-DC converter according to an embodiment for carrying out the present invention.

FIG. 1 is a diagram showing the configuration of a reverse current stopping circuit of a synchronous rectification type DC-DC converter according to an embodiment for carrying out the present invention. In the reverse current stopping circuit of the synchronous rectification type DC-DC converter shown in FIG. 1, a switching device Mp (30) including a P-channel MOSFET (Metal Oxide Semiconductor Field Effect Transistor) and a synchronous rectification MOSFET Mn (hereinafter referred to as "Mn" simply) (110) including an N-channel MOSFET operating complementarily to the switching device Mp (30) are connected in series between an input voltage terminal Vin (2) and the ground, while a series circuit of an inductor L (40) and an output capacitor Cout (50) is connected in parallel to the Mn (110). An end-to-end voltage of the output capacitor Cout (50) obtained from a node between the inductor L (40) and the output capacitor Cout (50), that is, an output voltage Vout (8) is fed back and applied to a controller (10). The controller (10) controls the operation of switching devices provided in the DC-DC converter to obtain a constant output voltage at an output terminal thereof. The controller (10) outputs a first control signal (12) and a second control signal (14) based on the fed-back output voltage Vout (8). The first control signal (12) is supplied to a driver (20). The driver (20) applies a driver output Vgp (25) to a gate of the switching device Mp (30).

On the other hand, the second control signal (14) is supplied to one of input terminals of an AND circuit (60) and a set terminal of a flip-flop (500). The first control signal (12) and the second control signal (14) outputted from the controller (10) are outputted as pulse signals whose duty ratios vary in accordance with the output voltage Vout (8). The duty ratios are in phase except for a dead time period provided for preventing the Mp (30) and the Mn (110) from being turned on concurrently. A Q output (550) of the flip-flop (500) is applied to the other input terminal of the AND circuit (60). The output of the AND circuit (60) is applied to a driver (70). The driver (70) applies a driver output Vgn (75) to a gate of the Mn (110). A reference voltage (ground potential) is applied to a non-inverting input terminal (V+) of a comparator (200).

On the other hand, a potential Vsw (switching terminal voltage) of a node (4) between a drain of the Mn (110) and the inductor L (40) is applied to an inverting input terminal (V_) of the comparator (200) through a node (6). The comparator (200) acquires a control signal Vctrl (450) for controlling an offset voltage. The control signal Vctrl (450) is based on a value stored in a memory (400) in advance (the value is determined by an output signal outputted from the reverse current detector circuit 300 in accordance with the states of the aforementioned voltages Vsw and Vgn, as will be described later). In accordance with the acquired control signal Vctrl (450), the comparator (200) controls the offset voltage to be supplied to the comparator (200). An output signal (250) is outputted from the comparator (200) operating based on the controlled input offset voltage, and applied to a reset terminal of the flip-flop (500). The details of the comparator (200) will be described later. The set input and the reset input of the flip-flop (500) are negative logic inputs.

The potential Vsw (switching terminal voltage) of the node (4) between the drain of the Mn (110) and the inductor L (40) is applied to one of inputs of the reverse current detector circuit (300) through the node (6) while the driver output Vgn (75) to be applied to the gate of the Mn (110) is applied to the other input. In accordance with the states of the voltages Vsw and Vgn immediately after the Mn (110) is turned off, the reverse current detector circuit (300) determines the state of the inductor current IL, and supplies an output signal (370) to the memory (400). The details of the reverse current detector circuit (300) will be described later. The memory (400) stores a predetermined value based on the output signal (370) of the reverse current detector circuit (300). The memory (400) supplies the control signal Vctrl (450) for controlling the offset voltage of the comparator (200) to the comparator (200) based on the stored value. The details of the memory (400) will be also described later.

Thus, a reverse current stopping circuit (100) includes the comparator (200), the reverse current detector circuit (300), the memory (400), the flip-flop (500) and the Mn (110).

Next, the operation of the reverse current stopping circuit of the synchronous rectification type DC-DC converter according to the present invention will be described. The reverse current stopping circuit shown in FIG. 1 illustrates its principal and configuration. The value of the inductor current IL at a point of time when the Mn (110) is turned off can be determined from a substantial change of potential of the node (4) of the inductor L (40), that is, the switching terminal voltage Vsw immediately after turning-off. The substantial change of the switching terminal voltage Vsw immediately after the synchronous rectification type DC-DC converter is turned off itself has been known to those with ordinary skill in the art (for example, JP-A-2002-281743). The reverse current detector circuit (300) detects a logic L level of the driver output Vgn (75) applied to the gate of the Mn (110). Further, the reverse current detector circuit (300) detects the potential Vsw (switching terminal voltage) of the node (4) immediately after turning-off, that is, immediately (after a predetermined time (hereinafter referred to as "Td")) after the driver output Vgn (75) reaches the logic L level. The reverse current detector circuit (300) decides which one of the states of FIGS. 2A to 2C the potential Vsw corresponds to.

Figure 2:
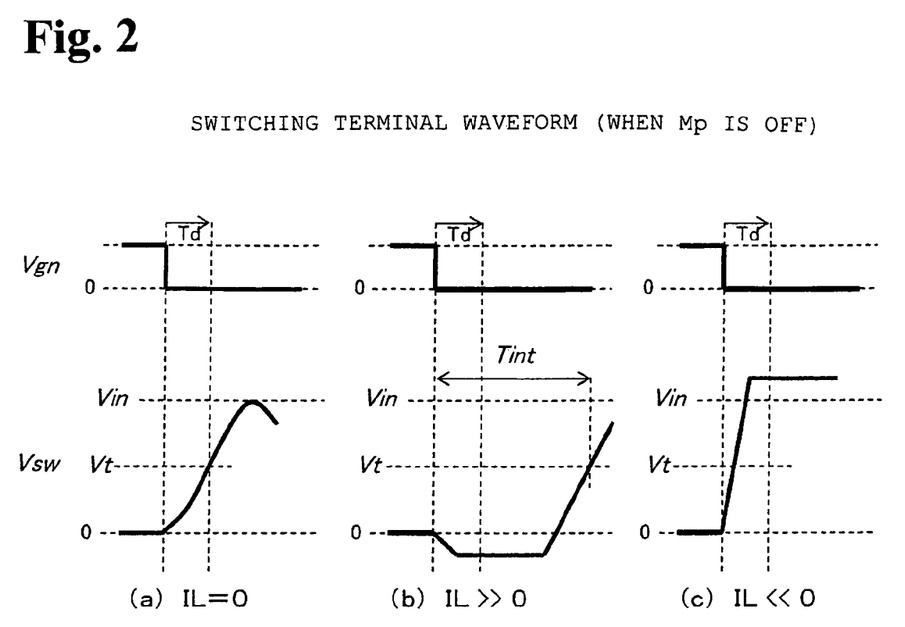
FIGS. 2A-2C are charts showing waveforms of switching terminal voltages.

Each of FIGS. 2A-2C shows an operation in a discontinuous current mode before the switching device Mp (30) is turned on. A body diode (112) and a parasitic capacitor (114) of the Mn (110) play an important role for the behavior of the potential Vsw (switching terminal voltage). That is, FIG. 2A shows the operation in the case where the Mn (110) is turned off without any offset voltage in the comparator (200) just when the inductor current IL is zero. The potential of the switching terminal voltage Vsw reaches Vt when Td has passed since the signal Vgn applied to the gate of the Mn (110) changes to the logic L level due to resonance in a circuit where the output voltage Vout (the Cout (50) can be approximated to a constant voltage source because it is much higher than the parasitic capacitor (114)) is applied to a series circuit of the inductor L (40) and the parasitic capacitor (114) (the initial values of the end-to-end voltage of the parasitic capacitor (114) and the inductor current IL are zero). Here, Vt designates a threshold voltage for detecting that the switching terminal voltage Vsw has arisen (reached the logic H level).

On the other hand, FIG. 2B shows the operation when the Mn (110) is turned off earlier than in FIG. 2A. Therefore, when the Mn (110) is turned off, a forward current (current flowing from the Vsw side to the Vout side) is still flowing in the inductor L (40). As soon as the Mn (110) is turned off, the parasitic capacitor (114) is charged to a negative side by the forward inductor current IL. As soon as the parasitic capacitor (114) reaches a forward voltage of the body diode (112) of the Mn (110), the body diode (112) is turned on to clamp the parasitic capacitor (114) to the forward voltage of the body diode (112). After that, when the inductor current IL reaches zero, resonance between the parasitic capacitor (114) and the inductor L (40) breaks out. FIG. 2B shows that a time Tint required for the potential of the switching terminal voltage Vsw to reach Vt is longer than the time Td in FIG. 2A.

Further, FIG. 2C shows the operation in the case where the Mn (110) is turned off later than FIG. 2A. Therefore, when the Mn (110) is turned off, a reverse current (current flowing from the Vout side to the Vsw side) is flowing in the inductor L (40). On this occasion, in a resonant circuit including the parasitic capacitor (114), the inductor L (40) and the Cout (constant voltage source) (50), resonance operation breaks out in the state where the initial value of the inductor current IL shows the aforementioned reverse current. When the resonant voltage reaches the sum of the input voltage Vin and the forward voltage of the body diode (35) of the switching device Mp (30), the body diode (35) is turned on to clamp the resonant voltage to the sum of the voltages. FIG. 2C shows that a time Tint required for the potential of the switching terminal voltage Vsw to reach Vt is shorter than the time Td in FIG. 2A.

In this manner, the potential Vsw (switching terminal voltage) of the node (4) is detected immediately after the Mn (110) is turned off, that is, immediately (after the time Td) after the driver output Vgn (75) reaches the logic L level, and decision is made as to which one of the states of FIGS. 2A to 2C the potential Vsw corresponds to. The output signal (370) corresponding to the result of the decision is applied to the memory (400). The memory (400) stores a predetermined value based on the output signal (370) applied thereto, and outputs the control signal Vctrl (450) for controlling the offset voltage of the comparator (200) based on the stored value. Based on the control signal Vctrl (450) supplied from the memory (400) to control the offset voltage, the comparator (200) moves its operating point where the comparator (200) will react with a higher or lower inductor current, or with a more positive or more negative current in accordance with whether the inductor current IL is lower (FIG. 2C) or higher (FIG. 2B) than zero. That is, the input offset voltage of the comparator (200) is increased or decreased by the control signal Vctrl (450) so that the effective threshold value level of the comparator (200) is adjusted to set the value of the inductor current IL at zero at a point of time when the synchronous rectification device Mn (110) is turned off. In this state, the comparator (200) compares the reference voltage (ground potential) with the switching terminal voltage Vsw, and consequently outputs the output signal (250) at the logic L level, which is applied to the reset terminal of the flip-flop (500). When the output signal (250) at the logic L level is applied to the reset terminal of the flip-flop (500), the flip-flop (500) sets its Q output (550) at the logic L level. Accordingly, the AND circuit (60) sets its output (65) at the logic L level. As a result, the driver (70) sets the gate of the Mn (110) at the logic L level so as to disable the Mn (110) from being switched on.

The flip-flop (500) reset in a cycle is set by a trailing edge of the second control signal (14) in a subsequent cycle. As a result, the Q output (550) of the flip-flop (500) reaches the logic H level to allow the second control signal (14) of the controller (10) to pass through the AND circuit (60) till the logic L level of the output signal (250) is supplied again to the reset terminal of the flip-flop (500). The logic H level signal of the second control signal (14) is applied to the gate of the Mn (110) through the driver (70) to switch on the Mn (110). Thus, on and after the subsequent cycle, the reverse current stopping circuit (100) repeats the operation to move the operating point where the comparator (200) will react with a more positive or more negative current in accordance with whether the inductor current IL is lower (FIG. 2C) or higher (FIG. 2B) than 0, based on the control signal Vctrl (450) supplied from the memory (400) to control the offset voltage. Finally, the operating point can be balanced on a point where the time between the trailing edge of Vgn and the leading edge of Vsw corresponds to Td. On this occasion, if Td is set at a suitable value, the Mn (110) can be turned off at a point where the inductor current IL is zero.

First Embodiment

Figure 3:
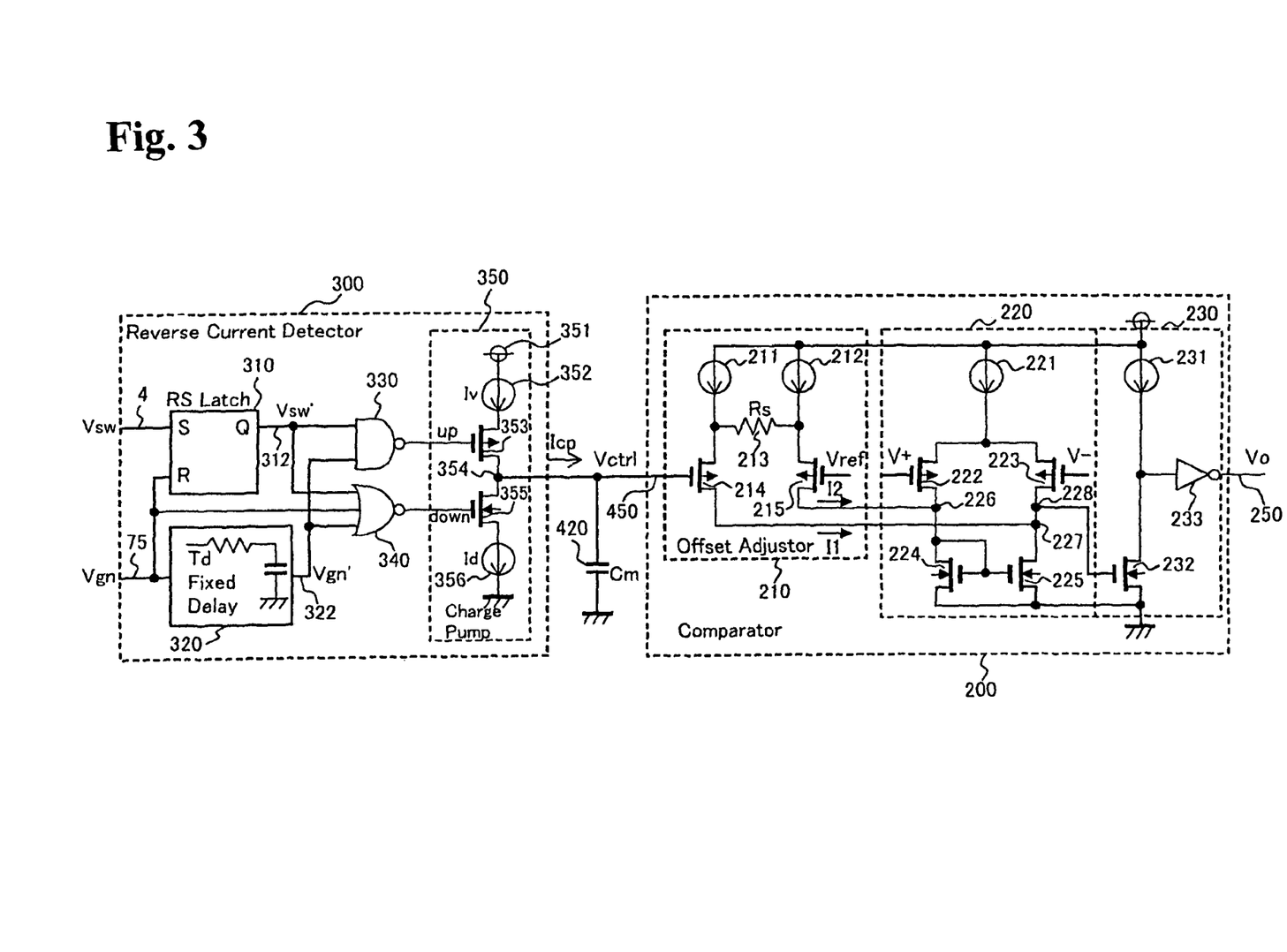
FIG. 3 is a diagram showing a main portion of a reverse current stopping circuit of a synchronous rectification type DC-DC converter according to a first embodiment of the present invention.

FIG. 3 is a diagram showing a main portion of a reverse current stopping circuit of a synchronous rectification type DC-DC converter according to a first embodiment of the present invention. As shown in FIG. 1, the reverse current stopping circuit of the synchronous rectification type DC-DC converter includes the comparator (200), the reverse current detector circuit (300), the memory (400), the flip-flop (500) and the Mn (110). Of those, the main portion of the reverse current stopping circuit shown in FIG. 3 relates to the configurations of the comparator (200), the reverse current detector circuit (300) and the memory (400).

The reverse current detector circuit (300) includes an RS latch (310), a delay circuit (320), a logic circuit and a charge pump (350). The RS latch (310) holds the leading edge of the Vsw (4). The delay circuit (320) delays the trailing edge of the Vgn (75) by the predetermined time Td. The logic circuit has a NAND circuit (330) and a NOR circuit (340) for logical operation of output signals Vsw' (312) and Vgn' (322) from the circuits (310) and (320). The charge pump (350) supplies a charging/discharging current to a capacitor Cm (420) serving as a memory. When the time between the trailing edge of the Vgn (75) and the leading edge of the Vsw (4) is shorter/longer than the time Td, the capacitor Cm (420) is charged/discharged by the charge pump (350). A threshold voltage for determining whether the input Vsw (4) in a set input terminal S of the RS latch (310) is on the logic H level or the logic L level corresponds to Vt shown in FIGS. 2A to 2C.

Figure 4:
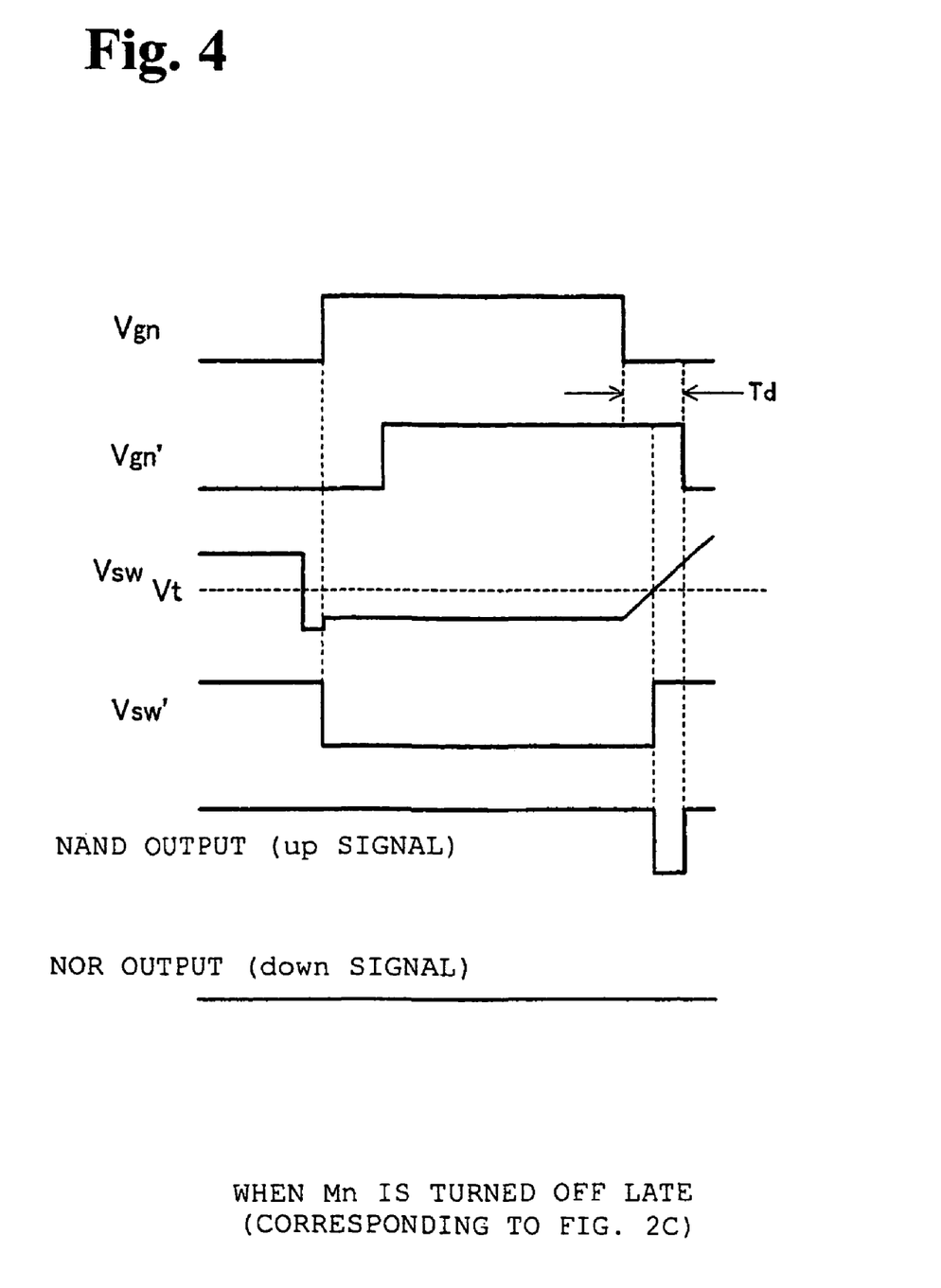
FIG. 4 is a waveform chart, corresponding to FIG. 2C, showing operating timings of the main portion of the reverse current stopping circuit shown in FIG. 3.
Figure 5:
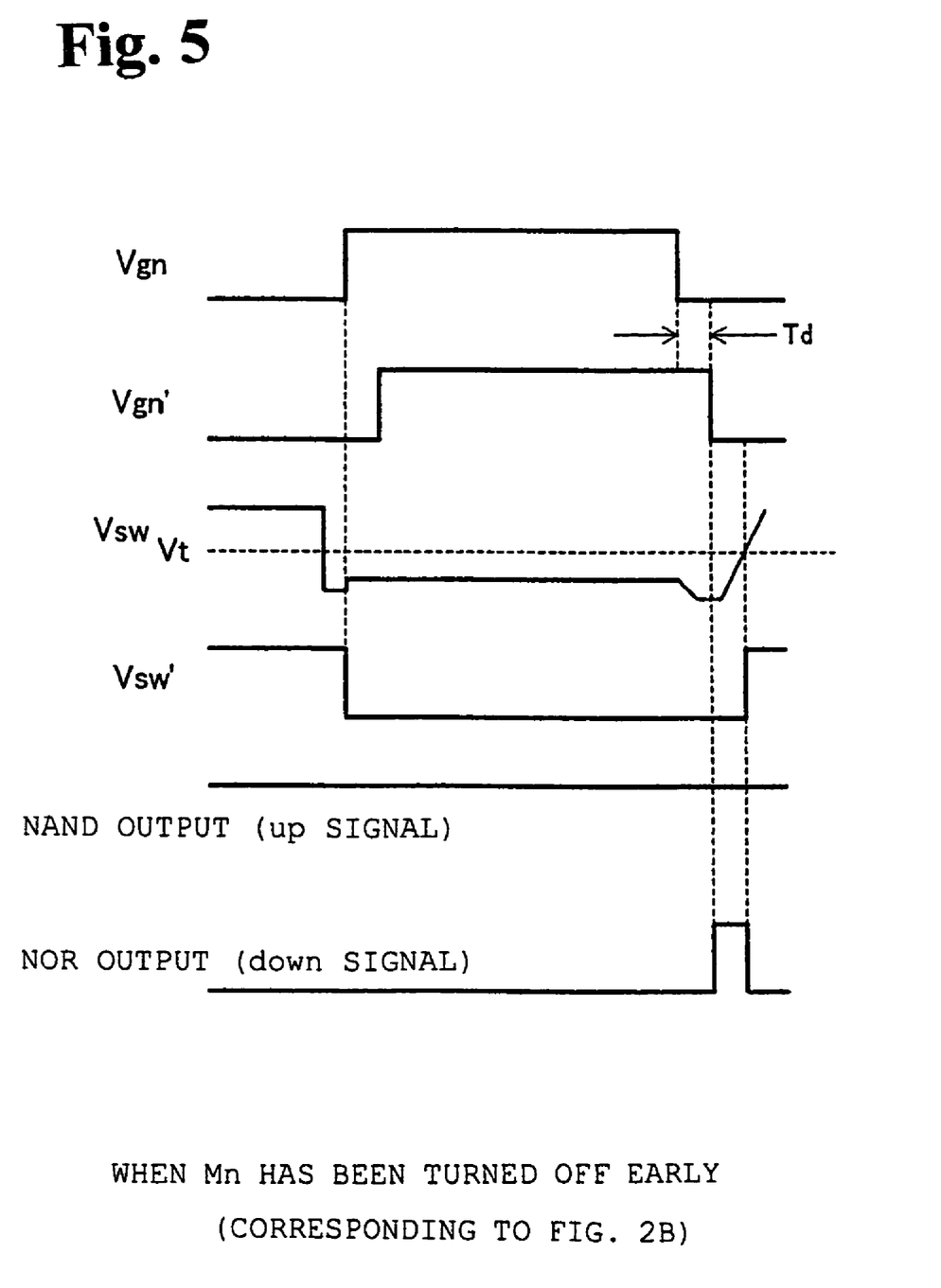
FIG. 5 is a waveform chart, correspondingly to FIG. 2B, showing operating timings of the main portion of the reverse current stopping circuit shown in FIG. 3.

The reverse current detector circuit (300) will be described with reference to FIGS. 4 and 5. FIG. 4 is a waveform chart showing operating timings of a main portion of the reverse current detector circuit shown in FIG. 3, corresponding to FIG. 2C. As shown in FIG. 4, when the Mn (110) is turned off late, an output up of the NAND circuit (330) is made active (logic L level) to turn on a P-channel MOSFET (353) of the charge pump (350). Thus, the charge pump (350) increases the amount of charges held by the capacitor Cm (420) by means of a constant current of a constant current source (352) so as to increase the end-to-end voltage of the capacitor Cm (420). As a result, a differential current (I1-I2) to be applied to a differential portion (220) of the comparator (200) is decreased (I1 is decreased and I2 is increased as shown in FIG. 3) to adjust the offset voltage so that the Mn (110) can be turned off earlier. On the other hand, FIG. 5 is a waveform chart showing operating timings of the main portion of the reverse current detector circuit shown in FIG. 3, corresponding to FIG. 2B. As shown in FIG. 5, when the Mn (110) is turned off early, an output down of the NOR circuit (340) is made active (logic H level) to turn on an N-channel MOSFET (355) of the charge pump (350). Thus, the charge pump (350) decreases the amount of charges held by the capacitor Cm (420) by means of a constant current of a constant current source (356) so as to decrease the end-to-end voltage of the capacitor Cm (420). As a result, the differential current (I1-I2) to be applied to the differential portion (220) of the comparator (200) is increased (I1 is increased and I2 is decreased) to adjust the offset voltage so that the Mn (110) can be turned off later.

The memory (400) includes the capacitor Cm (420). The offset voltage control signal Vctrl (450) to be supplied to the offset adjustor (210) of the comparator (200) corresponds to a value to be stored as a terminal voltage thereof.

The comparator (200) includes the offset adjustor (210), the differential portion (220) and an output portion (230). The offset adjustor (210) has current sources (211), (212), a resistor Rs (213) and P-channel MOSFETs (214), (215). The resistor Rs (213) is connected between sources of the MOSFETs (214), (215). The MOSFETs (214), (215) form a differential pair. Drains of the MOSFETs (214), (215) are connected to drains of P-channel MOSFETs (222), (223) at nodes (226) and (227) respectively. The P-channel MOSFETs (222), (223) are transistors forming a differential pair of the differential portion (220). The differential portion (220) includes a current source (221), the P-channel MOSFETs (222), (223) forming a differential pair, a diode-connected N-channel MOSFET (224) and an N-channel MOSFET (225). The MOSFETs (224), (225) form a current mirror circuit. The drain of the P-channel MOSFET (222) and a drain of the N-channel MOSFET (224) are connected to each other, and the node (226) of the both is connected to the drain of the P-channel MOSFET (215) of the offset adjustor (210). The drain of the P-channel MOSFET (223) and a drain of the N-channel MOSFET (225) are connected to each other, and the node (227) of the both is connected to the drain of the P-channel MOSFET (214) of the offset adjustor (210) while a node (228) is connected to a gate of the N-channel MOSFET (232) of the output portion (230). The P-channel MOSFET (223) and the N-channel MOSFET (225) form a first current path of the differential portion (220), and the P-channel MOSFET (222) and the N-channel MOSFET (224) form a second current path of the differential portion (220). The output portion (230) includes a current source (231), the N-channel MOSFET (232) and an inverter (233). The N-channel MOSFET (232) receives at its gate the output signal of the differential portion (220) as an input signal from the node (228) and amplifies the input signal. The inverter (233) is connected to a drain of the N-channel MOSFET (232). An output signal Vo (250) of the comparator (200) is outputted from the inverter (233). The aforementioned configuration excluding the offset adjustor (210) is the same as the configuration of a normal comparator known to those skilled in the art. Description will be made below on the operation of the comparator additionally including the offset adjustor (210).

The offset adjustor (210) applies to the differential portion (220) a current corresponding to a difference between a reference voltage Vref and the value stored in the capacitor Cm (420), that is, the control signal Vctrl (450) for controlling the offset voltage. That is, the drains of the MOSFETs (214) and (215) of the offset adjustor (210) serve as first and second current output terminals of the offset adjustor (210), respectively. The currents I1, I2 are applied to the first and second current paths of the differential portion (220) from the first and second current output terminals through the nodes (226), (227), respectively. Thus, as shown in FIG. 4, when the end-to-end voltage of the capacitor Cm (420) is increased by the control signal Vctrl (450), the current (I1-I2) to be applied to the differential portion (220) of the comparator (200) is decreased (I1 is decreased and I2 is increased) by the offset adjustor (210). As a result, the offset voltage between inputs $V_+$, $V_-$ is increased so that the Mn (110) can be turned off earlier. On the contrary, as shown in FIG. 5, when the end-to-end voltage of the capacitor Cm (420) is decreased by the control signal Vctrl (450), the differential current (I1-I2) to be applied to the differential portion (220) of the comparator (200) is increased (I1 is increased and I2 is decreased) by the offset adjustor (210). As a result, the offset voltage between the inputs $V_+$, $V_-$ is decreased so that the Mn (110) can be turned off later.

As a result, the input offset voltage of the comparator (200) is increased or decreased so that the synchronous rectification device Mn (110) is turned off at a point where the inductor current IL is more positive or more negative.

This operation is repeated during and after a subsequent cycle. Finally, the operating point can be balanced on a point where the time between the trailing edge of Vgn and the leading edge of Vsw corresponds to Td. On this occasion, if Td is set at a suitable value, the Mn (110) can be turned off at a point where the inductor current IL is zero. That is, the threshold level of the comparator (200) can be adjusted to a point where no reverse current exists.

Here, consideration will be made on the case where the load is not light. Under heavy load conditions, the synchronous rectification MOSFET Mn (110) and the switching device Mp (30) are turned on and off complementarily excluding a dead time in which the both are off. The dead time is usually designed to be fixed. Consideration will be made about what will happen if the reverse current detector circuit (300) is operating during the dead time.

When the switching device Mp (30) is turned on, the potential Vsw of the node (4) forcedly reaches the high (H) level. When this timing is later than the signal Vgn' (obtained by delaying Vgn by Td), the reverse current detector circuit (300) decides the state corresponds to that of FIG. 2B. That is, the reverse current detector circuit (300) concludes that the Mn (110) has been turned off early, and adjusts the input offset voltage such that the Mn (110) can be turned off later, as described above. Under heavy load conditions, the time when Vsw reaches the high (H) level is fixed to a time later than Vgn by the dead time in spite of such adjustment. Accordingly, in a subsequent cycle, the offset is adjusted so that the Mn (110) is turned off later. Finally, the end-to-end voltage of the capacitor Cm (420) reaches zero and the offset between the inputs $V_+$, $V_-$ becomes the minimum value. When a light load and discontinuous current mode breaks out in this state, operation starts unfavorably in the state where a reverse current flowing into the Mn (110) is the highest. This is originally caused by the fact that the dead time is longer than Td. It is, therefore, preferable that adjustment be made to set Td so as not to be shorter than the dead time.

Second Embodiment

Figure 6:
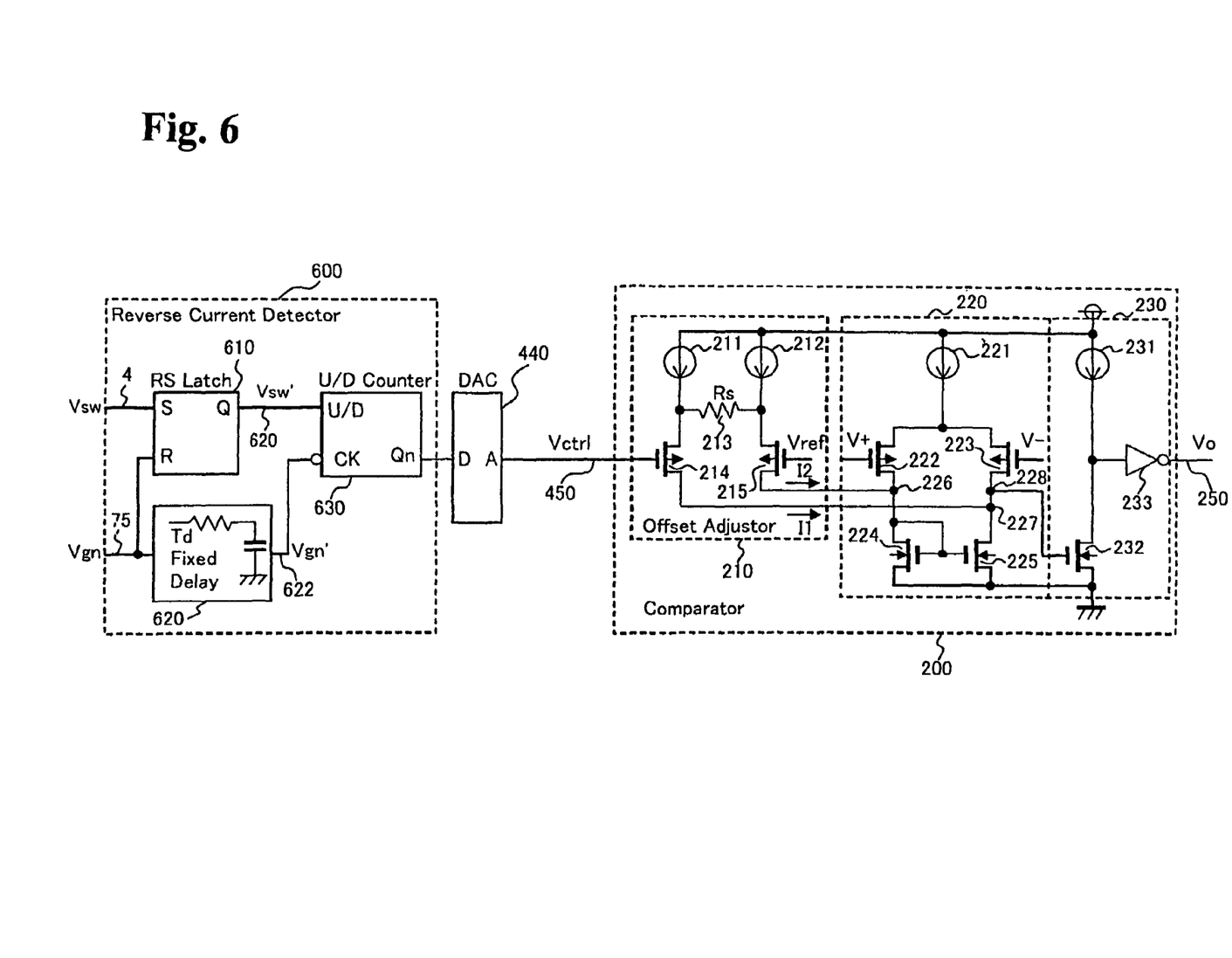
FIG. 6 is a diagram showing a main portion of a reverse current stopping circuit of a synchronous rectification type DC-DC converter according to a second embodiment of the present invention.

FIG. 6 is a diagram showing a main portion of a reverse current stopping circuit of a synchronous rectification type DC-DC converter according to a second embodiment of the present invention. As shown in FIG. 1, the reverse current stopping circuit of the synchronous rectification type DC-DC converter includes the comparator (200), a reverse current detector circuit (designated by 600 in FIG. 6 though 300 in FIG. 1), the memory (400), the flip-flop (500) and the Mn (110). Of those, the main portion of the reverse current stopping circuit shown in FIG. 6 relates to the configurations of the comparator (200), the reverse current detector circuit (600) and the memory (400).

The reverse current detector circuit (600) includes an RS latch (610), a delay circuit (620), and an up-down counter (630). The RS latch (610) holds the leading edge of the Vsw (4). The delay circuit (620) delays the trailing edge of the Vgn (75) by the predetermined time Td. The up-down counter (630) counts up or down the value of the counter when an output Vsw' (620) of the RS latch (610) is on the logic H level or on the logic L level at the trailing edge of an output Vgn' (622) of the delay circuit (620). That is, when the output Vsw' (620) of the RS latch (610) is on the logic H level (when the Mn (110) is turned off late (corresponding to FIG. 2C and FIG. 4)) or on the logic L level (when the Mn (110) is turned off early (corresponding to FIG. 2B and FIG. 5)) at the trailing edge of the output Vgn' (622) of the delay circuit (620) of the reverse current detector circuit (600), the value of the up-down counter (630) is counted up or down, and the count value counted up or down is held.

A D/A converter (440) receives at its digital input terminal D a digital count value counted up or down by the up-down counter (630) of the reverse current detector circuit (600), and converts the digital count value into an analog value. The D/A converter (440) then outputs the analog value from its analog terminal A as the control signal Vctrl (450) for controlling the offset voltage. The control signal Vctrl (450) is supplied to a gate of one transistor (214) of transistors forming a differential pair of the offset adjustor (210) of the comparator (200). That is, the memory (400) includes the D/A converter (440) and the up/down counter (630).

In the same manner as in the first embodiment shown in FIG. 3, the comparator (200) includes the offset adjustor (210), the differential portion (220) and the output portion (230). The offset adjustor (210) applies to the differential portion (220) a current corresponding to a difference between a reference voltage Vref and the control signal Vctrl (450) for controlling the offset voltage, which signal Vctrl (450) is obtained by converting the digital value stored in the memory (400) into an analog value. That is, the drains of the MOS-FETs (214), (215) of the offset adjustor (210) serve as first and second current output terminals of the offset adjustor (210), respectively. The currents I1, I2 are applied to the first and second current paths of the differential portion (220) from the first and second current output terminals through the nodes (226), (227), respectively. Thus, when the up-down counter (630) is counted up, the control signal Vctrl (450) to be applied to the offset adjustor (210) is increased so that the differential current (I1-I2) to be applied to the differential portion (220) of the comparator (200) is decreased (I1 is decreased and I2 is increased) by the offset adjustor (210). As a result, the offset voltage between inputs $V_+$, $V_-$ is increased so that the Mn (110) can be turned off earlier. On the contrary, when the up-down counter (630) is counted down, the control signal Vctrl (450) to be applied to the offset adjustor (210) is decreased so that the differential current (I1-I2) to be applied to the differential portion (220) of the comparator (200) is increased (I1 is increased and I2 is decreased) by the offset adjustor (210). As a result, the offset voltage between the inputs $V_+$, $V_-$ is decreased so that the Mn (110) can be turned off later.

As a result, the input offset voltage of the comparator (200) is increased or decreased so that the synchronous rectification device Mn (110) is turned off at a point where the inductor current IL is more positive or more negative.

This operation is repeated during and after a subsequent cycle. Finally, the operating point can be balanced on a point where the time between the trailing edge of Vgn and the leading edge of Vsw corresponds to Td. On this occasion, if Td is set at a suitable value, the Mn (110) can be turned off at a point where the inductor current IL is zero. That is, the threshold level of the comparator (200) can be adjusted to a point where no reverse current exists.

The disclosure of Japanese Patent Application No. 2008-140594 filed on May 29, 2008 is incorporated as a reference.

While the invention has been explained with reference to the specific embodiments of the invention, the explanation is illustrative and the invention is limited only by the appended claims.

What is claimed is:

1. A reverse current stopping circuit for stopping a reverse current of an inductor in a synchronous rectification type DC-DC converter, comprising:
a switching device;
a synchronous rectification device connected to the switching device and the inductor;
a comparator for detecting the reverse current of an inductor current from a drain-source voltage of the synchronous rectification device, said synchronous rectification device being configured to be turned off as soon as the reverse current of the inductor current is detected by the comparator;
a reverse current detector circuit for detecting a switching terminal voltage of the switching device immediately after the synchronous rectification device is turned off, thereby determining a value of the inductor current when the synchronous rectification device is turned off so as to decide whether the inductor current is flowing in a reverse direction from the inductor toward the synchronous rectification device or in a forward direction from the inductor to an output terminal; and
a memory unit for receiving a predetermined output signal output from the reverse current detector circuit in accordance with a decision made by the reverse current detector circuit, and outputting a control signal for controlling an offset voltage in accordance with the predetermined output signal to the comparator,
wherein the offset voltage of the comparator is changed in accordance with the control signal so as to adjust a value of the inductor current to zero when the synchronous rectification device is turned off.

2. A reverse current stopping circuit of a synchronous rectification type DC-DC converter according to claim 1, wherein the memory unit includes a capacitor, and the reverse current detector circuit includes a logic circuit and a charge pump, the logic circuit detecting whether a period between a time when the synchronous rectification device is turned off and a time when the switching terminal voltage increases to a predetermined voltage is longer or shorter than a predetermined time, and outputting a detection result to the charge pump to supply a current to the capacitor so as to increase or decrease an amount of charges of the capacitor.

3. A reverse current stopping circuit of a synchronous rectification type DC-DC converter according to claim 1, wherein the reverse current detector circuit includes an up-down counter and a D/A converter for converting a digital value counted by the up-down counter into an analog value, said reverse current detector circuit comparing a predetermined voltage with a value of the switching terminal voltage when a predetermined time has passed since the synchronous rectification device is turned off, and allowing the up-down counter to count up or down in accordance with a result of a comparison so as to increase or decrease the digital value counted by the up-down counter.

4. A reverse current stopping circuit of a synchronous rectification type DC-DC converter according to claim 2, wherein the predetermined time is set not to be shorter than a dead time.

5. A reverse current stopping circuit of a synchronous rectification type DC-DC converter according to claim 1, wherein the comparator includes an offset adjustor and a differential portion having a first current path including a first transistor and a second current path including a second transistor, said first and second transistors forming a differential pair, and
the offset adjustor has a first current output terminal for applying a first current to the first current path and a second current output terminal for applying a second current to the second current path, and adjusts a difference between the first current and the second current in accordance with a difference between a reference voltage and a control voltage of the control signal for controlling the offset voltage.

6. A reverse current stopping circuit of a synchronous rectification type DC-DC converter according to claim 5, wherein the offset adjustor has first and second P-channel MOSFETs having sources and forming a differential pair, a resistor connected between the sources, and first and second current sources connected to the sources, respectively, and wherein the first and second MOSFETs have drains connected to drains of the first and second transistors, respectively, as the first current output terminal and the second current output terminal.

7. A synchronous rectification type DC-DC converter comprising the reverse current stopping circuit according to claim 1.

* * * * *